US010869025B2

(12) United States Patent
Mate et al.

(10) Patent No.: US 10,869,025 B2
(45) Date of Patent: Dec. 15, 2020

(54) SWITCHING BETWEEN MULTIDIRECTIONAL AND LIMITED VIEWPORT VIDEO CONTENT

(71) Applicant: Nokia Technologies Oy, Espoo (FI)

(72) Inventors: Sujeet Shyamsundar Mate, Tampere (FI); Igor Danilo Diego Curcio, Tampere (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 16/261,224

(22) Filed: Jan. 29, 2019

(65) Prior Publication Data
US 2019/0246094 A1    Aug. 8, 2019

(30) Foreign Application Priority Data

Feb. 5, 2018 (GB) .................................. 1801833.3

(51) Int. Cl.
*H04L 29/06* (2006.01)
*H04N 13/332* (2018.01)
(Continued)

(52) U.S. Cl.
CPC ........... *H04N 13/332* (2018.05); *G06F 3/011* (2013.01); *H04L 65/80* (2013.01);
(Continued)

(58) Field of Classification Search
CPC .............................. H04N 13/332; H04L 65/80
(Continued)

(56) References Cited

U.S. PATENT DOCUMENTS 9,849,384 B1    12/2017 Energin
2012/0249424 A1    10/2012 Bove et al.
(Continued)

FOREIGN PATENT DOCUMENTS

| AU | 2008255262 A1 | 7/2010 |
| GB | 2561343 A | 10/2018 |
| GB | 2567136 | 4/2019 |

OTHER PUBLICATIONS

GB Application No. 1713885.0, "Moving Between Spatially Limited Video Content and Omnidirectional Video Content", filed on Aug. 30, 2017, pp. 1-34.
(Continued)

*Primary Examiner* — Christopher S Kelley
*Assistant Examiner* — Asmamaw G Tarko
(74) *Attorney, Agent, or Firm* — Alston & Bird LLP

(57) ABSTRACT

This specification describes a method comprising: in response to detecting a user switching from viewing multidirectional video content to viewing limited viewport video content corresponding to the multidirectional video content or from viewing limited viewport video content corresponding to multidirectional video content to viewing the multidirectional video content: determining transition content for transitioning between a current viewport associated with the content being viewed and a landing viewport associated with the content to be viewed, the transition content being determined based on the current viewport and the landing viewport, wherein the length of the transition content depends on an angular distance between the current viewport and the landing viewport; and outputting the transition content for display.

17 Claims, 7 Drawing Sheets

(51) Int. Cl.
| | |
|---|---|
| *H04N 21/81* | (2011.01) |
| *H04N 21/422* | (2011.01) |
| *H04N 21/4728* | (2011.01) |
| *H04N 21/44* | (2011.01) |
| *H04N 21/41* | (2011.01) |
| *G06F 3/01* | (2006.01) |
| *H04N 21/6587* | (2011.01) |
| *H04N 21/2365* | (2011.01) |
| *H04N 21/434* | (2011.01) |
| *H04N 21/4363* | (2011.01) |
| *H04N 21/2343* | (2011.01) |
| *H04N 21/431* | (2011.01) |
| *H04N 21/4402* | (2011.01) |

(52) U.S. Cl.
CPC ..... *H04N 21/2365* (2013.01); *H04N 21/4122* (2013.01); *H04N 21/4126* (2013.01); *H04N 21/42202* (2013.01); *H04N 21/42222* (2013.01); *H04N 21/4347* (2013.01); *H04N 21/43637* (2013.01); *H04N 21/44004* (2013.01); *H04N 21/44008* (2013.01); *H04N 21/44016* (2013.01); *H04N 21/4728* (2013.01); *H04N 21/6587* (2013.01); *H04N 21/816* (2013.01); *H04N 21/23439* (2013.01); *H04N 21/4316* (2013.01); *H04N 21/4402* (2013.01)

(58) Field of Classification Search
USPC .......................................................... 348/39
See application file for complete search history.

(56) References Cited

U.S. PATENT DOCUMENTS

| | | | |
|---|---|---|---|
| 2014/0267420 A1* | 9/2014 | Schowengerdt | G06F 3/012 |
| | | | 345/633 |
| 2015/0269785 A1* | 9/2015 | Bell | G06T 19/003 |
| | | | 345/427 |
| 2017/0111595 A1 | 4/2017 | Soni et al. | |
| 2017/0316806 A1 | 11/2017 | Warren et al. | |
| 2019/0238612 A1* | 8/2019 | Xie | H04L 67/38 |

OTHER PUBLICATIONS

Search Report received for corresponding United Kingdom Patent Application No. 1801833.3, dated Jul. 18, 2018, 6 pages.
Extended European Search Report received for corresponding European Patent Application No. 19155006.0, dated Jul. 2, 2019, 12 pages.
Office Action for European Application No. 19 155 006.0 dated May 20, 2020, 11 pages.

* cited by examiner

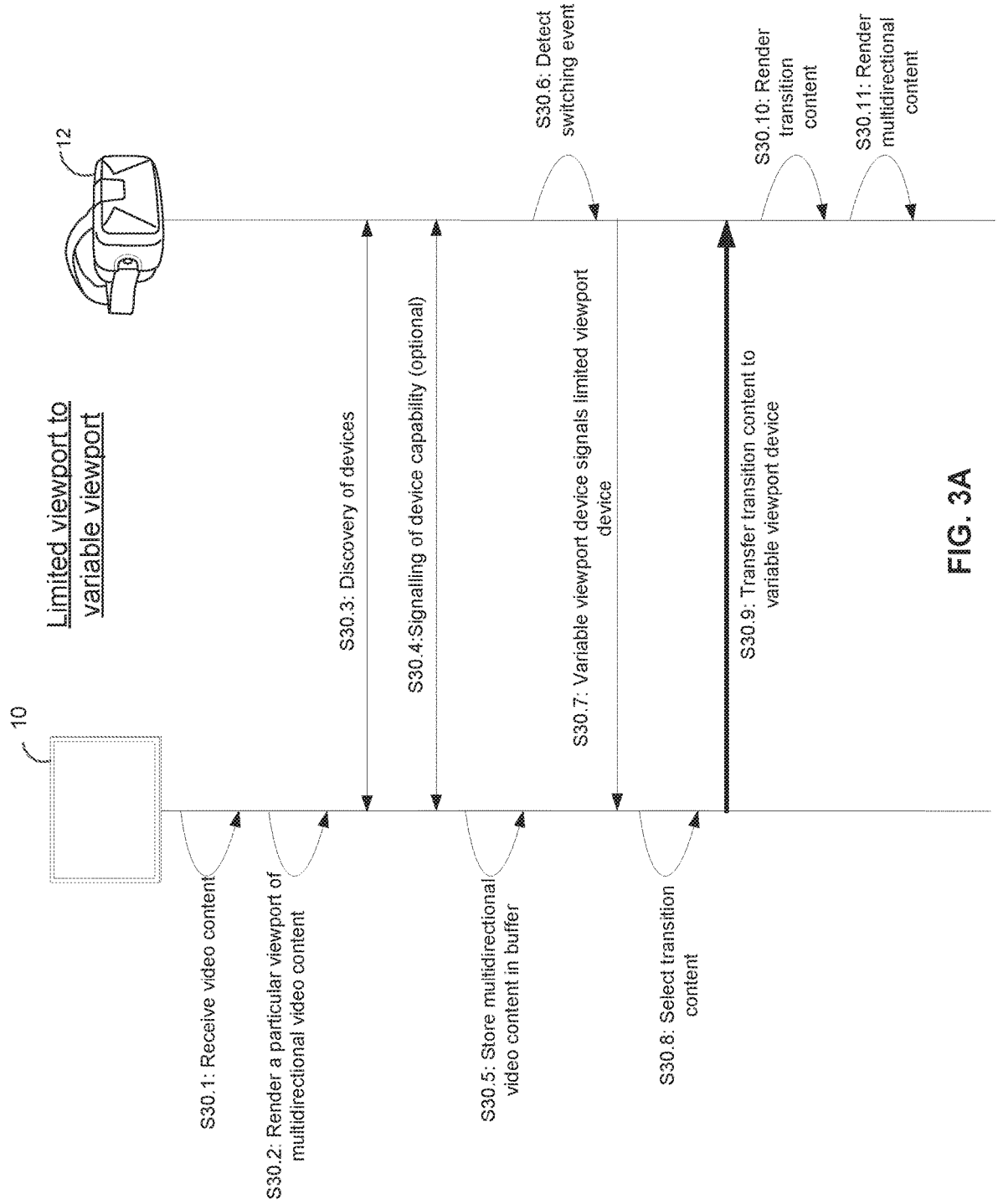

SWITCHING BETWEEN MULTIDIRECTIONAL AND LIMITED VIEWPORT VIDEO CONTENT

FIELD

This specification relates to the field of video content display, particularly that of transition of display between devices.

BACKGROUND

A number of different devices can now be used to display video content. Such devices include limited viewport devices and variable viewport devices. Limited viewport devices may include devices such as televisions (TV), laptops, mobile phones, tablet computers, or personal computers (PC). Variable viewport devices may include devices such as virtual reality (VR), augmented reality (AR) or head-mounted display (HMD) devices. In general terms, a limited viewport or field-of-view (FOV) device may be a device with which it is generally not possible for the user to change the perspective (particularly the direction) from which they view the displayed content. Conversely, a variable viewport device may be a device with which a user is able to view different perspectives within the content. Content that is specifically adapted for viewing on a variable viewport device may be referred to as multidirectional content. When the available field-of-view of the multidirectional content covers 360 degrees, the content may be referred to as omnidirectional content.

By using particular devices for different elements of the video content, user experience may be enhanced. However, it is known that switching between devices during the display of the video content may cause adverse effects on the viewing experience for the user. Such adverse effects may include, for example, motion sickness and discontinuity of the video content.

SUMMARY

In a first aspect, this specification describes a method comprising: in response to detecting a user switching from viewing multidirectional video content to viewing limited viewport video content corresponding to the multidirectional video content or from viewing limited viewport video content corresponding to multidirectional video content to viewing the multidirectional video content: determining transition content for transitioning between a current viewport associated with the content being viewed and a landing viewport associated with the content to be viewed, the transition content being determined based on the current viewport and the landing viewport, and the length of the transition content depends on an angular distance between the current viewport and the landing viewport; and outputting the transition content for display.

In a second aspect, this specification describes an apparatus comprising: at least one processor; and at least one memory including computer program code which, when executed by the at least one processor, causes the apparatus to: in response to detecting a user switching from viewing multidirectional video content to viewing limited viewport video content corresponding to the multidirectional video content or from viewing limited viewport video content corresponding to multidirectional video content to viewing the multidirectional video content: determine transition content for transitioning between a current viewport associated with the content being viewed and a landing viewport associated with the content to be viewed, the transition content being determined based on the current viewport and the landing viewport, and the length of the transition content depends on an angular distance between the current viewport and the landing viewport; and outputting the transition content for display.

In either of the first and second aspects, the length of the transition content may further depend on a predetermined angular speed for the transition from an angular position associated with the current viewport to an angular position associated with the landing viewport.

The transition content may comprise a series of spatial portions of the multidirectional video content which are spatially located between the current viewport and the landing viewport.

At least a portion of the multidirectional content may be stored in a continuously updating buffer.

Determining the transition content may comprise selecting the transition content from the multidirectional content stored in the continuously updating buffer based on the current viewport and the landing viewport.

The storing of the multidirectional video content in the continuously updating buffer may be based on the current viewport and the landing viewport.

The spatial extent of the multidirectional video content stored in the buffer may be dependent on angular positions of the current viewport and the landing viewport.

The duration of the multidirectional video content stored in the buffer may be dependent on angular positions of the current viewport and the landing viewport.

The transition content may comprise a sequence of frames, each having an associated angular position, and the angular position associated with the frames may gradually vary from an angular position corresponding with, or nearer to, an angular position of the current viewport to an angular position corresponding with, or nearer to, an angular position of the landing viewport.

The current viewport may be being viewed on a first device, the landing viewport may be to be viewed on a second device, and the outputting the transition content may be for display on the second device.

The first device may be a limited viewport display device and the second device may be a variable viewport display device.

The current viewport may comprise a planar representation of, or corresponding to, a spatial portion of the multidirectional video content.

Outputting the transition content may comprise transmitting the transition content to the second device.

Detecting the user switching from viewing content on the first device to viewing content on the second device may comprise detecting the user activating or putting on the second device.

The first device may comprise a television, a video projector, a mobile phone, a laptop, a personal computer or a tablet computer and/or the second device may comprise a head mounted display, an augmented reality device or a virtual reality device.

The first device may comprise a variable viewport display device and the second device comprises a limited viewport display device.

The landing viewport on the second device may comprise a planar representation of a portion of the multidirectional video content.

The first device may communicate information indicative of the current viewport to the second device.

Detecting a user switching between viewing content on the first device and viewing content on the second device may comprise detecting the user deactivating or taking off the first device.

The second device may comprise a television, a video projector, a mobile phone, a laptop, a personal computer or a tablet computer and/or the first device may comprise a head mounted display, an augmented reality device or a virtual reality device.

In a third aspect, this specification describes an apparatus configured to perform any method as described with reference to the first aspect.

In a fourth aspect, this specification describes computer-readable instructions which, when executed by computing apparatus, cause the computing apparatus to perform any method as described with reference to the first aspect.

In a fifth aspect, this specification describes a computer-readable medium having computer-readable code stored thereon, the computer readable code, when executed by at least one processor, causes performance of: in response to detecting a user switching from viewing multidirectional video content to viewing limited viewport video content corresponding to the multidirectional video content or from viewing limited viewport video content corresponding to multidirectional video content to viewing the multidirectional video content: determining transition content for transitioning between a current viewport associated with the content being viewed and a landing viewport associated with the content to be viewed, the transition content being determined based on the current viewport and the landing viewport, and the length of the transition content depends on an angular distance between the current viewport and the landing viewport; and outputting the transition content for display. The computer-readable code may further, when executed, cause performance of any of the operations described with reference to the method of the first aspect.

In a sixth aspect, this specification describes apparatus comprising: means for, in response to detecting a user switching from viewing multidirectional video content to viewing limited viewport video content corresponding to the multidirectional video content or from viewing limited viewport video content corresponding to multidirectional video content to viewing the multidirectional video content, determining transition content for transitioning between a current viewport associated with the content being viewed and a landing viewport associated with the content to be viewed the transition content being determined based on the current viewport and the landing viewport, and the length of the transition content depends on an angular distance between the current viewport and the landing viewport; and means for outputting the transition content for display. The apparatus of the sixth aspect may further comprise means for causing performance of any of the operations described with reference to the method of the first aspect.

BRIEF DESCRIPTION OF THE DRAWINGS

For better understanding of the present application, reference will now be made by way of example to the accompanying drawings in which:

FIGS. 3A and 3B show flow charts illustrating operations which may be performed in order to provide a transition between viewing content on one device and viewing content on another device;

DETAILED DESCRIPTION OF EMBODIMENTS

Figure 1A:
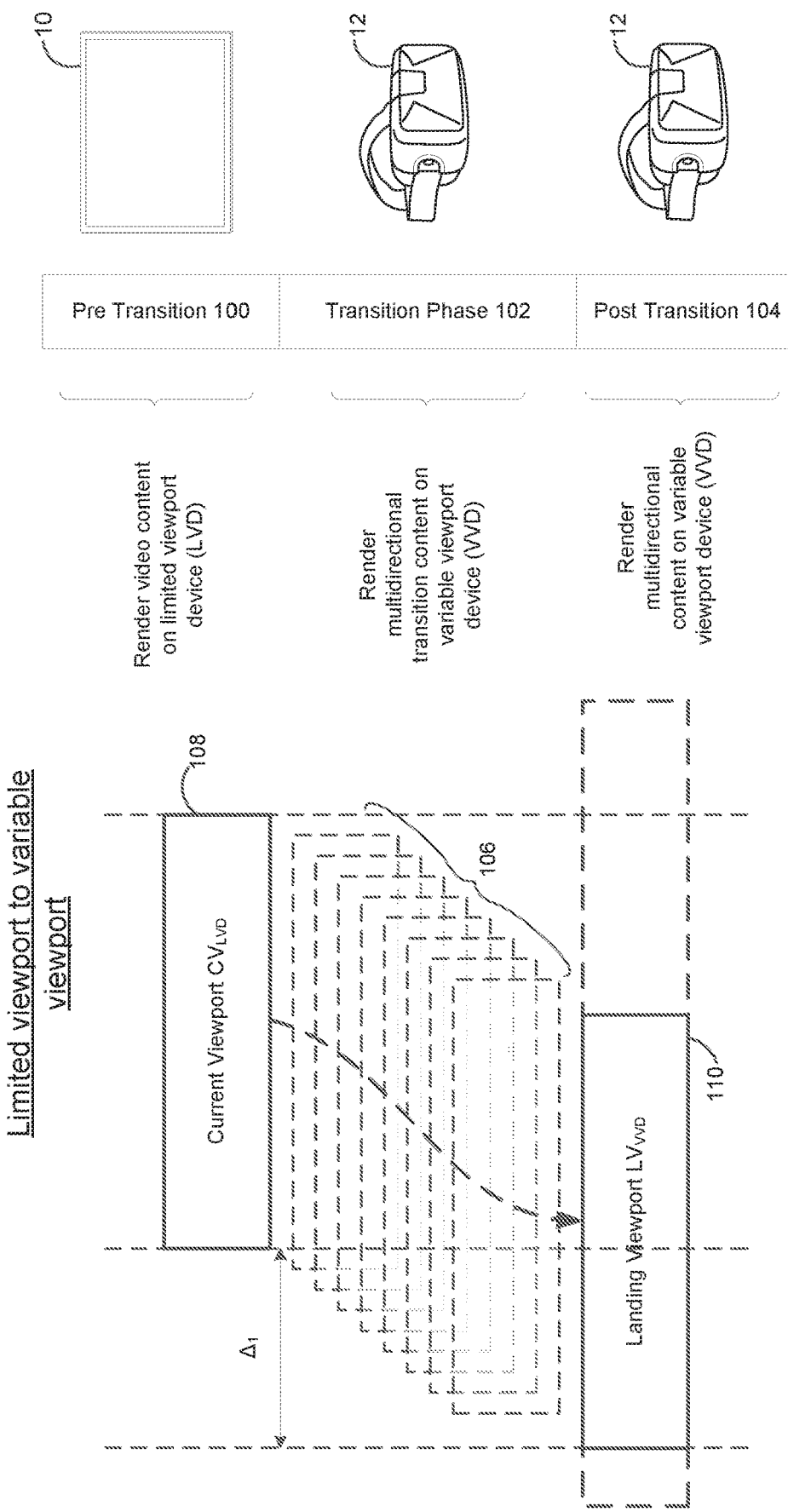
FIG. 1A shows a viewing session transition from display of content on a limited viewport device to display of content on a variable viewport device.

In the description and drawings, like reference numerals refer to like elements throughout.

The present disclosure relates, in part, to transitions between viewing content on variable viewport devices and viewing content on limited viewport devices. Some embodiments relate to switching between watching omnidirectional content and limited viewport content, that is content with limited spatial extent, with the same rendering device.

When a user wishes to change the device via which they are consuming video content, and to transfer the viewing session to another device, a number of adverse effects may be experienced. For instance, the user may miss the viewing of several seconds of video content while they transition between the two devices. This may occur, in particular, when the content being viewed is broadcast content which cannot be paused. In addition, the buffering of content may become more complex when a viewing session is transferred from one device to another device, particularly when the devices differ substantially in the horizontal spatial extent of the content provided thereon. For example, when a transition of a viewing session occurs between a variable viewport device, which is arranged to display multidirectional content, and a limited viewport device, which is arranged to display content with a limited viewport, some content may be unseen by the user as a result of the differing spatial extents of the two devices. A loss of the context associated with the transmitted video content may therefore be experienced by the user. There is therefore a need to provide a method and apparatus which facilitates temporal continuity of displayed content and to provide spatial orientation continuity when switching from one rendering device to another.

As will be appreciated, whether a device is considered a variable viewport device or a limited viewport device may, in some instances, depend on a mode in which the device is operating and/or the content that is received. For instance, a mobile phone or tablet computer may serve as a variable viewport device if the content is multidirectional and, for instance, the device is operating in a mode in which it is configured to respond to inputs, e.g. received via one or more accelerometers, to adjust the field of view within the displayed content.

This specification describes methods, techniques and apparatuses for content transport and signalling, which improve user experience when transitioning between devices by reducing or eliminating the above-described adverse effects. The methods, techniques and apparatuses may be particularly well suited for use when transitioning between a head-mounted display and a non-hand-held limited viewport device, such as but not limited to a television, a projector, a personal computer, and a laptop.

The method of the present disclosure involves, firstly, storing at least a portion of multidirectional video content in a buffer. This may occur while a user is viewing video content on a first device. As will be appreciated, the buffer stores a duration (e.g. a number of seconds) of the video content that is in advance of the instant in time of the content currently being displayed on the first device.

As will be discussed in more detail below, the first device may be one of a limited viewport device (such as, but not limited to, a television) and a variable viewport device (such as, but not limited to, an HMD), and the second device may be the other one of the limited viewport device and the variable viewport device. The nature of the content displayed on the first device may depend on the nature of the first device. For instance, when the first device is a variable viewport display device, the displayed content may be multidirectional video content (that is, content in which the user is able to change the direction from which the content is viewed). Conversely, when the first device is a limited viewport device, the displayed content may be limited viewport video content or limited viewport content (that is, content for which the user is unable to change the viewing direction). The limited viewport content displayed on the limited viewport device corresponds to the stored multidirectional video content, and may be, for instance, a limited viewport version of the multidirectional video content or a particular predetermined projection of the multidirectional video content.

Multidirectional video content may include video content covering multiple fields of view which a number of tiles of content span a continuous spherical or cylindrical spatial extent. An example of multidirectional content is omnidirectional content, which may cover substantially 360 degrees in horizontal dimension and 180 degrees in vertical dimension. In other examples, multidirectional content may cover a smaller spatial extent, for example 180 degrees in horizontal dimension.

Limited viewport video content may be provided as a planar representation of such multidirectional content by projecting a particular field of view of the spherical or cylindrical spatial extent of the multidirectional content into a planar view. For example, limited viewport video content corresponding to cylindrical multidirectional video content may be a projection of a particular field of view of the cylinder of the multidirectional video content onto a rectangular spatial extent.

At some point, a switching event is detected. The switching event indicates that the user has switched or is intending to switch from viewing the content on the first device to viewing content on a second device, or between watching a first type of content to second type of content with the same device. The first type of content may be multidirectional and the second type of content may be limited viewport content, or vice versa.

In response to detecting the switching event, transition content may be determined. The transition content is content to be displayed on the second device in order to provide a transition between a current viewport associated with the content being viewed on the first device and a landing viewport associated with the content to be viewed on the second device.

In the context of this specification, a current viewport may refer to a portion of the multidirectional content that is currently being displayed on the first device, or to a portion of the multidirectional content which corresponds to the currently displayed limited viewport content.

Similarly, a landing viewport may refer to a portion of the multidirectional content that will be displayed on the second device when the transition has finished, or to a portion of the multidirectional content that corresponds with the limited viewport content that will be displayed on the second device when the transition has finished. Although the transition is described between devices, it is appreciated that the second device may also be the first device in the case that the transition is done between viewing different types of content with the same rendering device. A landing viewport or a viewport may comprise a region which is rendered on a display or a head-mounted display. In case of omnidirectional content, a viewport may correspond to a sphere region formed by a region encompassed by four great circles comprising two elevation circles and two azimuth circles.

In some examples, the transition content may be selected from the multidirectional video content stored in the buffer, based on the current viewport and the landing viewport. That is, in response to the switching event, particular spatial portions of the stored multidirectional content may be identified and selected for use as transition content based on the current viewport and the landing viewport.

In other examples, the content stored in the buffer may be the transition content. That is, rather than particular spatial portions of the stored multidirectional content being identified and selected from the stored multidirectional content in response to the switching event, only those spatial portions of the multidirectional content may be stored in the buffer in the first place.

The duration of the transition content may be dependent on an angular distance (e.g. viewport traversal distance, which may involve change in azimuth and/or elevation) between the current viewport and the landing viewport. That is, the duration of the content may be dependent on the rotation of the field of view in the multidirectional video content that is required to transition from the current viewport to the landing viewport.

The transition content may comprise spatial portions of each of a sequence of frames of the multidirectional video content. A viewing direction associated with the spatial portions may gradually change across the sequence from a direction associated with the current viewport to a direction associated with the landing viewport. In this way, the spatial portions of the sequence of frames of multidirectional video content may provide a gradual transition between the field-of-view of the current viewport and the field-of-view of the landing viewport.

Once the transition content has been determined, it is output for display on the second device during a transition period. The transition period may correspond to the duration of the transition content. This may include rendering the spatial portions of the sequence of frames of the multidirectional video content for display on the second device.

The methods and apparatuses described herein may provide one or more of the following technical advantages:

1) During a transition in the display of video content between two devices including a variable viewport device and a limited viewport device, the temporal continuity of the video content being displayed may be preserved. That is, video content being displayed before a transition, during a transition and after a transition in the present disclosure may maintain the temporal continuity of the video content such that content missed by the user is reduced.

2) A user's experience and comfort during the viewing of content when undergoing a transition between devices may be enhanced by reducing or preventing a user's motion sickness due to a perceived motion of the video content.

3) The end-to-end latency perceived by the user may be reduced during the device switch due to the buffering of transition content. The amount of transition content which may be buffered may depend on a capacity of the device being used, and/or may depend upon the data rates of the transition content. Further, as the buffered transition content may include information about the desired projection during the transition, a need for transcoding may be reduced. Therefore, functionality in diverse network latency situations may be improved. Also, the methods and apparatuses described herein may facilitate improved handling of devices with differing capabilities, such as a buffering capacity.

4) A "buffering time" or latency during which a buffer is being filled after a transition to a second device has occurred may be reduced. As such, the latency of outputting content on a second device in response to a switching event may be reduced and a user experience may be enhanced as a result.

FIG. 1A, illustrates a transition of a viewing session of video content from a limited viewport device 10 to a variable viewport device 12.

During a pre-transition phase 100, video content is initially rendered and displayed at the limited viewport device 10. The video content may be a projection of a particular spatial portion of multidirectional video content. Alternatively, the video content may be limited viewport content, which corresponds with multidirectional video content that is available for display by a variable viewport device 12. A current viewport associated with the content displayed at the limited viewport device 10 may correspond with a particular spatial portion of the multidirectional video content that is also available.

Although not illustrated in FIG. 1A, as described above, during the output of the video content on the limited viewport device 10, at least a portion of the corresponding multidirectional video content is stored in a buffer.

The buffer may be a circular buffer. The buffer may, for instance, be located on the limited viewport device 10 or on a storage device connected to the limited viewport device 10.

Alternatively, the buffer may be located remotely on a server. In other examples, the buffer may be located at the variable viewport device 12. In general terms, the buffer may be located at a one of the devices that is persistently connected to a content provider which provides the video content. It may be preferable for the buffer to be located at, or in association with, the one of the devices which has greater processing resources available for management of the buffer and determination of the transition content.

The content stored in the buffer may include at least spatial portions 106 of the multidirectional content which are located (spatially) between the current viewport 108 and the landing viewport 110. That is, the content stored in the buffer preferably includes at least the spatial portions of the multidirectional content that are required to provide the transition content.

As will be discussed in more detail below with reference to FIGS. 2A and 2B, in examples in which the transition content is selected from the multidirectional content stored in the buffer, the content stored in the buffer may include the full spatial extent of the multidirectional video content, or may include only part of the full spatial extent of the multidirectional video content.

As will also be discussed in more detail below with reference to FIGS. 2A and 2B, the spatial extent and/or the duration of the content stored in the buffer may be dependent on the current viewport 108 and the landing viewport 110. Clearly this is the case when the transition buffer stores only the transition content, but it may also be the case when the transition content is only a selected portion of the stored multidirectional content in the buffer.

In response to a switching event being detected, the transition content is, in the transition phase 102, rendered for display on the second device, which in this example is the variable viewport device 12. The switching event may, for instance, be the detection of the user picking up the variable viewport device 12, switching on or waking-up the variable viewport device 12, or putting on the variable viewport device 12.

Although not illustrated in FIG. 1A, in examples in which the buffer is maintained on the limited viewport device 10, the transition content may be transferred to the variable viewport device 12 in response to the switching event. Alternatively, the transition content may be obtained directly at the variable viewport device after the switching event has been detected. However, this may result in a higher latency, since the content will be requested from the content server (over public Internet), instead of obtaining it over a local network (assuming that TV and HMD are connected over the same home network).

The transition content may include spatial portions 106 of the stored multidirectional video content which are spatially located between the current viewport 108 and the landing viewport 110, as defined at the time that the switching event is detected. That is, the spatial portions 106 may be spatially located in the angular region $\Delta_1$ in FIG. 1A, which shows the angular distance between the current viewport 108 at the time of the detection of the switching event and the landing viewport 110 at the time of the detection of the switching event. The angular region $\Delta_1$ may also be referred to as the angular skew between the current viewport 108 and the landing viewport 110.

FIG. 1A illustrates, using dashed lines, a sequence of frames 106 of transition content. Each of the frames 106 corresponds to a respective spatial portion of the multidirectional content. In examples such as that of FIG. 1A, in which the transition content is displayed on a variable viewport device, each of the frames 106 of the transition content may be a particular spatial portion of the multidirectional content. This may contrast with examples such as that of FIG. 1B in which the transition content is displayed on a limited viewport device and in which case the frames 156 of the transition content may be limited viewport projections of particular spatial portions of the multidirectional content.

The spatial extent/width of the field-of-view of each of the frames 106 of the transition content may be dependent on the dimensions of the display on which the transition content is to be displayed (which, in this example, is the variable viewport device 12).

An angular position (viewing direction) associated with each of the frames 106 in the sequence gradually changes across the sequence from an angular position at, or close to, the current viewport 108 to an angular position at, or close to, the landing viewport 110. As such, when the frames 106 are displayed sequentially, a gradual change in the angular position of the spatial portion of the content being displayed is provided. Thus, a seamless transition between the current viewport 108 and the landing viewport 110 can be achieved by gradually changing the viewing direction associated with successive frames in the series.

In some examples, an angular position of the first frame in the sequence may be a particular angular distance from the angular position of the current viewport. Similarly, an angular position of the final frame in the sequence may be a particular angular distance from the angular position of the landing viewport. The particular angular distances may be determined similarly to angular distances between frames of transition content. As such, the particular angular distances may be similar to angular distances between angular positions of successive frames of transition content that are in the vicinity of the first/final frame.

In some examples, the change in angular position of the spatial portion with which each frame corresponds may be constant. That is, the angular distance between each frame and the next does not change throughout the sequence. Alternatively, the change in angular position may not be constant. For instance, at the beginning of the sequence (the start of the transition) a smaller angular difference may be used. The angular distance may increase towards the middle of the sequence, and then may reduce again towards the end of the sequence (the end of the transition). In this way, during transition, the viewport may slowly move away from the current viewport, may speed up, and then may slowly arrive at the landing. This may provide a smooth transition.

The frames of the transition content are rendered and output on the variable viewport device 12 during the transition phase. The duration of the transition content (which may correspond to the number of frames) may be determined based on the angular distance between the current viewport and the landing viewport. In other words, the duration of the transition content may be dependent on the size of the angular region $\Delta_1$ in FIG. 1A.

Once the final frame of the transition content (the spatial location of which is sufficiently close to that of the landing viewport) has been output, the multidirectional content is rendered and output on the variable viewport device 12 in the post-transition phase 104.

Figure 1B:
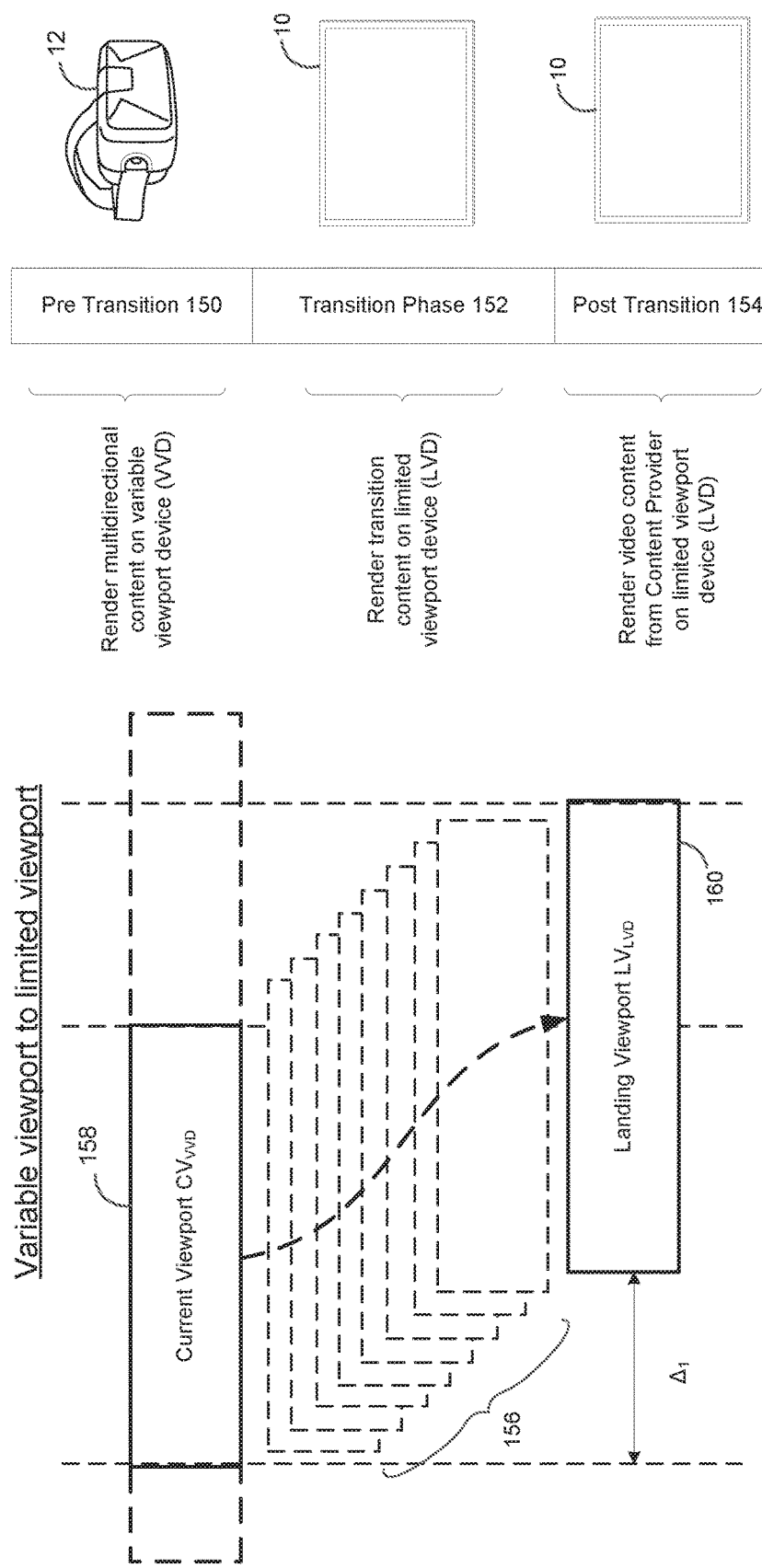
FIG. 1B shows a viewing session transition from display of content on a variable viewport device to display of content on a limited viewport device.

FIG. 1B shows a transition of a viewing session of video content from a variable viewport device 12 to a limited viewport device 10. The process is similar to that described above with reference to FIG. 1A, except that the first device, from which the viewing session is transferred, is the variable viewport device 12 and the second device, to which the viewing session is transferred, is the limited viewport device 10. In addition, the frames 156 of the transition content are displayed on the limited viewport device 10. The frames 156 may comprise limited viewport projections of particular spatial portions of the multidirectional content.

The switching event in the example shown in FIG. 1B may be, for instance, a detection of the user putting down the variable viewport device, turning off the variable viewport device, or removing the variable viewport device. This may occur in the transition phase 152.

As mentioned above, the buffer may be maintained on the limited viewport device 10. As such, there may be no need for the transition content to be transferred between devices upon detection of the switching event. However, to enable the limited viewport device 10 to generate the transition content, the limited viewport device 10 may repeatedly receive updates regarding the current viewport 158 of the content displayed on the variable viewport device 12 during the pre-transition phase 150.

In both of the above-described transitions, if the current viewport 158 or the landing viewport 160 of the variable viewport device 12 is outside of the field-of-view of the limited viewport device 10, multidirectional content is primarily used for the transition content. This is because the multidirectional content has the required intermediate views, which can allow for a smooth viewport transition.

Figure 2A:
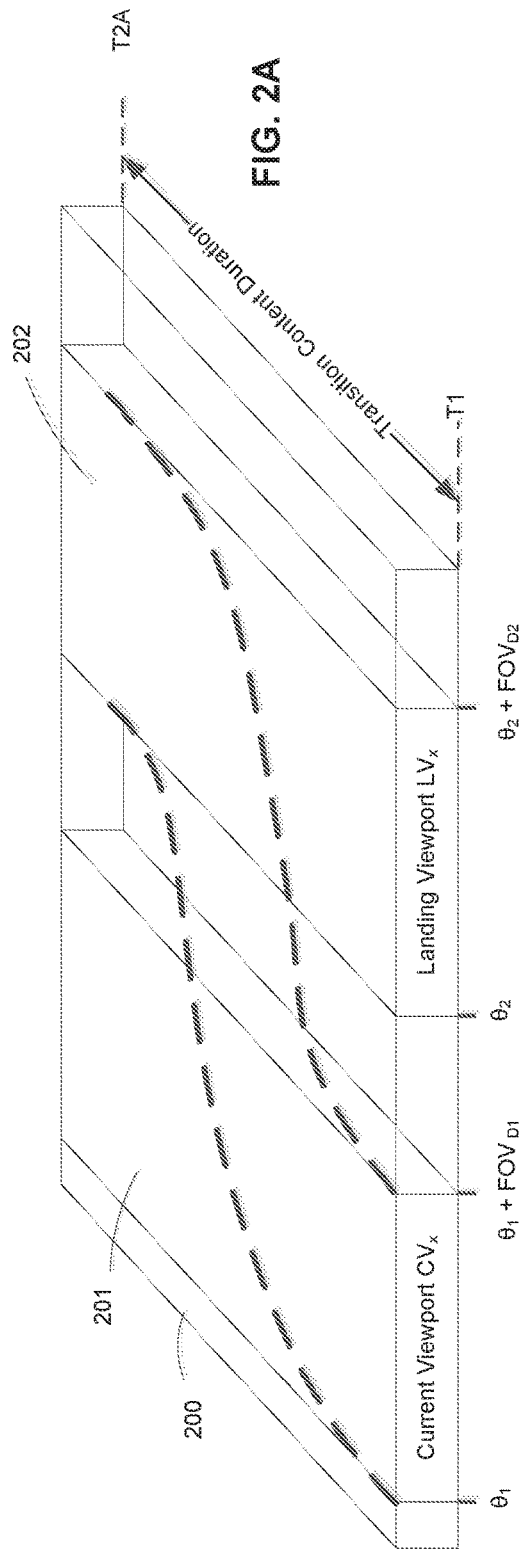
FIGS. 2A and 2B illustrate a buffer of video content which may be used for providing a transition between a current viewport on a first device and a landing viewport on a second device.
Figure 2B:
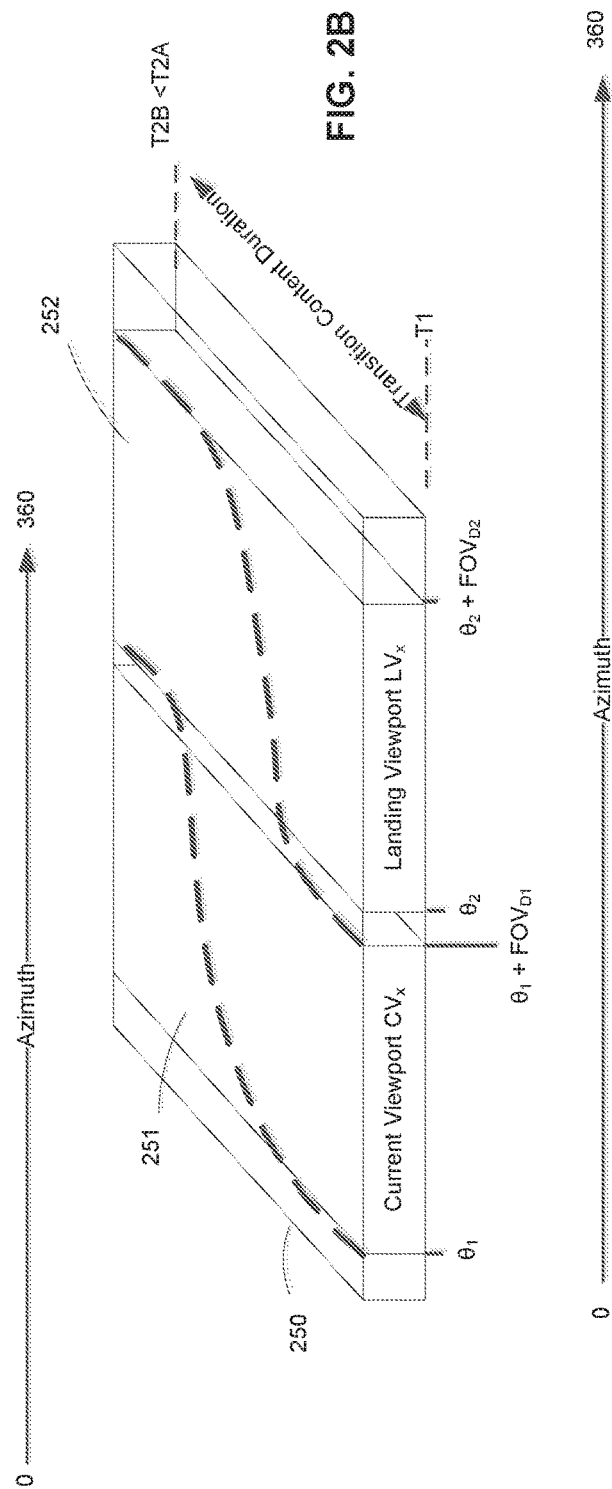

FIGS. 2A and 2B schematically illustrate the buffering of multidirectional video content for provision of the transition content.

Each of FIGS. 2A and 2B illustrate relative angular positions of the current viewport and the landing viewport within the multidirectional content. They may be located at any angular position within the angular extent of the multidirectional content. In full multidirectional content, they may be located anywhere in an angular range between 0 and 360 degrees.

In each of FIGS. 2A and 2B, one edge of the current viewport is located at a first angular position $\theta_1$, with the other edge being located at an angular position $\theta_1+FOV_{D1}$, where $FOV_{D1}$ is the spatial extent/width of the field-of-view of the first device. The landing viewport is located such that a first edge is located at a second angular position $\theta_2$, with the other edge being located at an angular position $\theta_2+FOV_{D2}$, where $FOV_{D2}$ is the spatial extent/width of field-of-view of the second device. An angular distance between the current viewport and the landing viewport is determined by calculating the difference in the respective angular positions of the current viewport and the landing viewport $\theta_2-\theta_1$.

In the examples of FIGS. 2A and 2B the current viewport and the landing viewport are located on same vertical level of the multidirectional content and therefore the difference between angular positions of the viewports can be defined by azimuth angle only. However, in other examples the current viewport and the landing viewport may be located at different vertical levels of the multidirectional content. That is, the difference between angular positions of the viewports can also be defined by the angle of elevation between the current viewport and the landing viewport. In one embodiment an angular position of a viewport is defined by a location of the centre of the viewport, and an angular distance between viewports is determined as the angular distance between the locations of the respective centres of the viewports. This angular distance may be defined by the azimuth angle only, if the centre of each viewport is at the same vertical level, the elevation angle only, if the centre of each viewport is at the same horizontal level, or a combination of azimuth angle and elevation angle.

The tracked dotted lines in FIGS. 2A and 2B show the transition of the viewing session from the current viewport $CV_x$ to the landing viewport $LV_x$. The spatial portions of the multidirectional content that form the frames of transition content may be content that is located between the two dotted lines. As such, the angular positions of each of the frames of transition content may be located between the angular position of the current viewport $CV_x$ and the angular position of the landing viewport $LV_x$.

The duration of the transition content may be based on the current viewport and the landing viewport. More specifically, the duration of the transition content may depend on the magnitude of the angular distance between the current viewport and the landing viewport. Thus, if the current viewport on the first device is a large angular distance from the landing viewport on the second device, the duration of the transition is increased, thereby ensuring that the transition can be effected smoothly. That is, if $\theta_2-\theta_1$ is large, for example, then the transition content selected will be longer in duration.

This is apparent from FIGS. 2A and 2B, in which the angular difference $\theta_2-\theta_1$ between the current and landing viewports is larger in FIG. 2A than in FIG. 2B. As a consequence, the duration ($T_{2A}$-$T_1$) of the transition content in FIG. 2A is greater than the duration ($T_{2B}$-$T_1$) of the transition content in FIG. 2B.

The duration of the transition content may be directly proportional to the angular distance between the current viewport and the landing viewport at the time of the switching event. In other words, the transition period is directly proportional to the value of $\Delta_1$ in FIGS. 1A and 1B or $\theta_2$-$\theta_1$ in FIGS. 2A and 2B.

The duration of the transition content can be expressed as the quotient of the angular distance $D_\theta$ between the current viewport and the landing viewport and an angular transition speed $V_\theta$. That is, the duration of the transition content may be represented by Equation 1 below:

$$\text{Duration of transition content} = D_\theta / N_\theta \quad \text{Equation 1}$$

The angular transition speed $V_\theta$ may be predetermined. In examples, in which the angular transition speed is not constant (e.g., as described above, it may have a non-constant speed profile, such as slow-faster-slow), the angular transition speed $V_\theta$ may be the average speed of the speed profile. The transition speed may be derived based on user preferences or with default system preference. In some embodiments, the transition speed may be dictated by the permitted buffer size, with higher transition speed required to constrain the amount of transition content.

The video content stored in the buffer may also vary depending on the positions of the current viewport and the landing viewport. More specifically, the spatial extent and/or the duration of the multidirectional video content stored in the buffer may be dependent on the positions of the current viewport and the landing viewport.

For instance, when the angular distance between the current viewport and the landing viewport is larger, a greater spatial extent of the multidirectional content may be stored in the buffer. In some examples, the spatial extent of the multidirectional content stored in the buffer may be at least equal to the angular difference plus the width of the field-of-view of the second device (i.e. $\theta_2$-$\theta_1$+$FOV_{D2}$). Put another way, the spatial extent may encompass a range of angular differences from a first edge of the current viewport to a second, opposite edge of the landing viewport. This ensures that the buffer contains all of the spatial portions of the multidirectional content that are required to generate the transition content.

In some examples, the buffer may include a greater spatial extent than is required dictated based on a current angular separation between the current and landing viewports. For instance, the buffer may include the full spatial extent of the multidirectional content. This is illustrated in FIG. 2A, in which the full 360 degrees of the multidirectional content is stored in a buffer. Alternatively, the spatial extent stored in the buffer may extend outside the first edge of the current viewport and the second edge of the landing viewport by a predetermined angular distance. This is illustrated in FIG. 2B. Depending on the angular distance between the landing viewport and the current viewport, this may not equate to the full extent of the multidirectional content, as is the case in FIG. 2B in which the full 360 degrees of the multidirectional content is not stored in the buffer.

As mentioned above, multidirectional content is often received as a plurality of tiles, each representing a different field of view of the content. In examples in which the full spatial extent of the content is not stored in the buffer, the requesting device (for instance, the limited viewport device 10), may request only those tiles which contain a portion of the current viewport or a portion of the landing viewport, or are located between the current and landing viewports. Any other tiles may not be requested or stored. In some examples, the content provider may determine which tiles to provide to the device, for instance, based on information received from the device, which indicates angular positions of the current and landing viewports. Alternatively, if the device knows the tile configuration of the multidirectional content, it may determine which tiles are required, based on the angular positions of the current and landing viewports, and may request the required tiles explicitly.

The duration of the content stored in the buffer may also be dependent on the angular positions of the current and landing viewports. For instance, when the angular distance between the current and landing viewports is smaller, a shorter duration of multidirectional content may be stored in the buffer. Conversely, when the angular distance between the current and landing viewports is larger, a longer duration of multidirectional content may be stored in the buffer.

In other examples, the duration of the multidirectional content stored in the buffer may be constant. For instance, it may correspond to a duration required when the current and landing viewports are at their maximum possible angular separation. Alternatively, the duration of the multidirectional content stored in the buffer may include a predetermined duration in addition to the duration dictated based on the current angular separation between the current and landing viewports and the angular speed.

By storing additional content in the buffer (either spatial extent and/or duration), greater flexibility may be provided. More specifically, it may allow appropriate transition content to be generated even when the angular separation between the current viewport and the landing viewport increases significantly shortly before a switching event is detected.

One or both of the landing viewport and the current viewport may vary over time. For instance, when the first device is the variable viewport device, the current viewport may vary depending on a direction in which the device is oriented. Similarly, when the first device is the limited viewport device, the current viewport may change, for instance, as the perspective provided on the limited viewport device changes, for instance, when the camera pans to follow a moving subject-of-interest (e.g. an object or a person) within a scene.

When the first device is the variable viewport device 12, information of the current viewport being displayed on the variable viewport device 12 may be communicated to the limited viewport device 10. For example, in some implementations, the limited viewport device 10 may be continually updated with information from the variable viewport device 12 regarding the current viewport of the content being displayed at any given time. In this way, the content stored in the buffer at the limited viewport device 10 may be continually updated according to the changes in the current viewport on the variable viewport device 12. Alternatively, the variable viewport device 12 may only signal information to the limited viewport device 10 regarding a current viewport of the content being displayed on the variable viewport device 12 when a switching event occurs. In this way, the transition content may be selected from the content stored in the buffer based on the signalled current viewport provided by the variable viewport device 12 to the limited viewport device 10.

When the second device is the variable viewport device, the landing viewport may, in some examples, be dependent on an orientation of the variable viewport device. Alternatively, when the second device is either of the variable viewport device or the limited viewport device, the landing viewport may be dependent on a location within the scene of a subject of interest. The subject-of-interest may be specified by the user or by the creator of the content.

As a result of the changing landing and/or current viewport, the spatial extent and/or the duration of the content stored in the buffer, from which the transition content is selected, may be continually updated as the landing viewport and/or the current viewport changes. This may not be the case when the maximum spatial extent and maximum duration are stored in the buffer.

FIG. 3A is a message flow diagram illustrating various operations which may be performed when transitioning a viewing session from a limited viewport device to a variable viewport device.

At operation S30.1, video content is received at the limited viewport device 10. The limited viewport device 10 may include a television, a video projector, a mobile phone, a laptop, a personal computer, a tablet computer or the like. The video content may be broadcast content, video-on-demand (VOD) content, or any other kind of multimedia audio-visual content. The video content may be multidirectional video content and the limited viewport device 10 may display a particular field-of-view (or a projection of a particular field-of-view) of the multidirectional video content. Alternatively, the video content may be limited FOV or limited viewport content, which corresponds with multidirectional video content which is available to be consumed, via a variable viewport device 12.

At operation S30.2, the received video content is rendered and displayed via the limited viewport device 10. The content that is rendered and displayed via the limited viewport device 10 corresponds to a spatial portion/particular field-of-view of the corresponding multidirectional video content. The particular field-of-view with which the displayed content corresponds may change over time. As will be appreciated from the above description, the current viewport at a particular instant in time is the particular field-of-view with which the displayed content corresponds at that time.

At operation S30.3, the limited viewport device 10 and the variable viewport device 12 discover each other. This may be achieved by use of one of a number of different communication/connection protocols. For instance, the two devices may discover each other via Bluetooth pairing, Wi-Fi communication or a physical wired connection. As will be appreciated, in some examples, the subsequent operations may only be performed if both a limited viewport device and a variable viewport device are present. As such, the subsequent operations may be performed in response to the variable viewport device 12 being discovered by the limited viewport device 10.

At operation S30.4, signalling of capability information between the limited viewport device 10 and the variable viewport device 12 may occur. The signalling may comprise transferring multidirectional video information from the variable viewport device 12 to the limited viewport device 10. This information may be used by the limited viewport device 10 when requesting multidirectional video content for use in generating transition content. More specifically, the information may be used to request multidirectional video content of a format which is compatible with the variable viewport device 12. The signalling of operation S30.4 may also or alternatively include providing one or more codecs from the variable viewport device 12 to the limited viewport device 10. For example, the one or more codecs may allow the transition content to be transmitted from the limited viewport device 10 to the variable viewport device 12 in a coded/compressed format. The signalling may also facilitate an evaluation of the availability of the coder-decoder arrangement of each device.

The signalling of operation S30.4 can be carried out using hypertext-transfer protocol (HTTP) or any other suitable protocol. In some examples, the signalling may be omitted. However, the use of such signalling may reduce the latency in the transition and may, therefore, enhance the user's experience.

At operation S30.5, multidirectional video content is stored in a buffer. The buffer may be maintained on the limited viewport device 10. The multidirectional video content may be stored in a format suitable for output on the variable viewport device 12. The limited viewport device 10 may request the multidirectional video content from a content provider. For example, the limited viewport device may request multidirectional video content from a broadcast provider, an external server or any other suitable content provider. As described above in relation to FIGS. 2A and 2B, in some examples the amount of multidirectional video content that is stored in the buffer may depend on the current viewport and the landing viewport.

At operation S30.6, a switching event may be detected by the variable viewport device 12. The switching event may be an event, which indicates that the user wishes to transfer the viewing session from the limited viewport device 10 to the variable viewport device 12.

As described above, a switching event may include, for instance, detection of the user activating multidirectional content consumption on the variable viewport device 12. Activation may, in some examples, be performed by the user putting on a wearable variable viewport device, such as an HMD in such examples, the switching event may be detected, for example, by using an accelerometer fitted in the variable viewport device 12 to detect movement of the variable viewport device 12, or by using touch sensors fitted to the variable viewport device 12 to detect contact with the user. Alternatively, the switching event may be detected by monitoring a power status of the variable viewport device 12.

Although in FIG. 3A the switching event is shown to be detected by the variable viewport device 12, in some examples, the switching event may be detected by the limited viewport device 10. For instance, the switching event may correspond to the limited viewport device 10 discovering the presence of the variable viewport device 12 (for instance, when the variable viewport device 12 is switched on/activated).

In some examples, the switching event may be a planned event. For instance, the switching event may occur as a predetermined time instant during the video content. Such a planned event may be preselected or entered by a user at one of the devices, for example.

In examples in which the variable viewport device 12 detects the switching event, the device 12 may respond to detecting the switching event, by signalling/notifying the limited viewport device 10 at operation S30.7.

The signalling of operation S30.7 may comprise a timestamp corresponding to the switching event. For example, the timestamp may indicate the time at which the variable viewport device 12 was activated and/or put on. Alternatively, in some implementations, a planned transition between devices may occur and the timestamp may indicate the time in the future at which the switching event is scheduled to take place. In other words, the timestamp may indicate the time in the future at which the transition of the viewing session from the limited viewport device 10 to the variable viewport device 12 should occur.

The signalling may also indicate the intended landing viewport on the variable viewport device 12. The intended landing viewport may, for instance, be dependent on an orientation of the variable viewport device 12. For example, the landing viewport may be dependent on the orientation of the user's head in the event that the variable viewport device is a head-mounted display device being worn by the user.

Alternatively, in some implementations, the intended landing viewport may, for instance, be dependent on the position of a particular person or object of interest identified in the limited viewport content. The person or object of interest may be identified by the user, for example. The landing viewport may be such that the identified person or object of interest remains in view during and/or after the transition. In such implementations, if a particular person or object of interest is not identified in the limited viewport content, the variable viewport device may assume a viewport according to a default preference of the variable viewport device based on a particular parameter. For example, a suitable parameter may include magnetic North or another suitable positional reference.

The intended landing viewport and/or the timestamp may be used to determine an appropriate content file or data format. The file or data format corresponds to the data that corresponds to different viewports at different temporal instances. This allows the client to request the appropriate content depending on the viewport transition while switching from one device to another. This may facilitate the spatial and temporal selection of the relevant content for the transition in operation S30.8. In this way, the signalled information may be applied to various different standards, such as, but not limited to MPEG-DASH, OMAF, and ISOBMFF.

In operation S30.8, the transition content may be determined based on the current viewport the landing viewport. In some examples, it may be selected from the multidirectional content stored in the buffer, as described above with reference to FIGS. 1A, 1B, 2A and 2B. As described above, the transition content may be just a portion of the content stored in the buffer. Alternatively, the buffer may in some examples include only the transition content.

The transition content is selected such that the frames of transition content output during the transition phase represent a field-of-view which changes with an appropriate angular speed (or angular speed profile) from the field-of-view of the current viewport at the limited viewport device 10 to the landing viewport at the variable viewport device 12.

The angular speed and/or angular speed profile may be predetermined by the system and/or the user. It may be substantially constant, such that it does not depend on the angular separation between the current viewport and landing viewports.

Subsequently, in operation S30.9, the transition content is transferred to the variable viewport device 12.

At operation S30.10, the transition content is rendered at the variable viewport device 12. The transition content is then output on the variable viewport device 12 with a pre-defined frame rate to provide a gradual transition between the current viewport on the limited viewport device 10 and the intended landing viewport on the variable viewport device 12. Thus, a seamless transition between displaying content on each of the two devices is provided.

At operation S30.11, after display of the transition content has been completed, multidirectional video content received at the variable viewport device 12 is rendered and displayed at the variable viewport device 12. Immediately after the display of the transition content, the viewport of the multidirectional content that is displayed may correspond with the landing viewport.

Figure 3B:
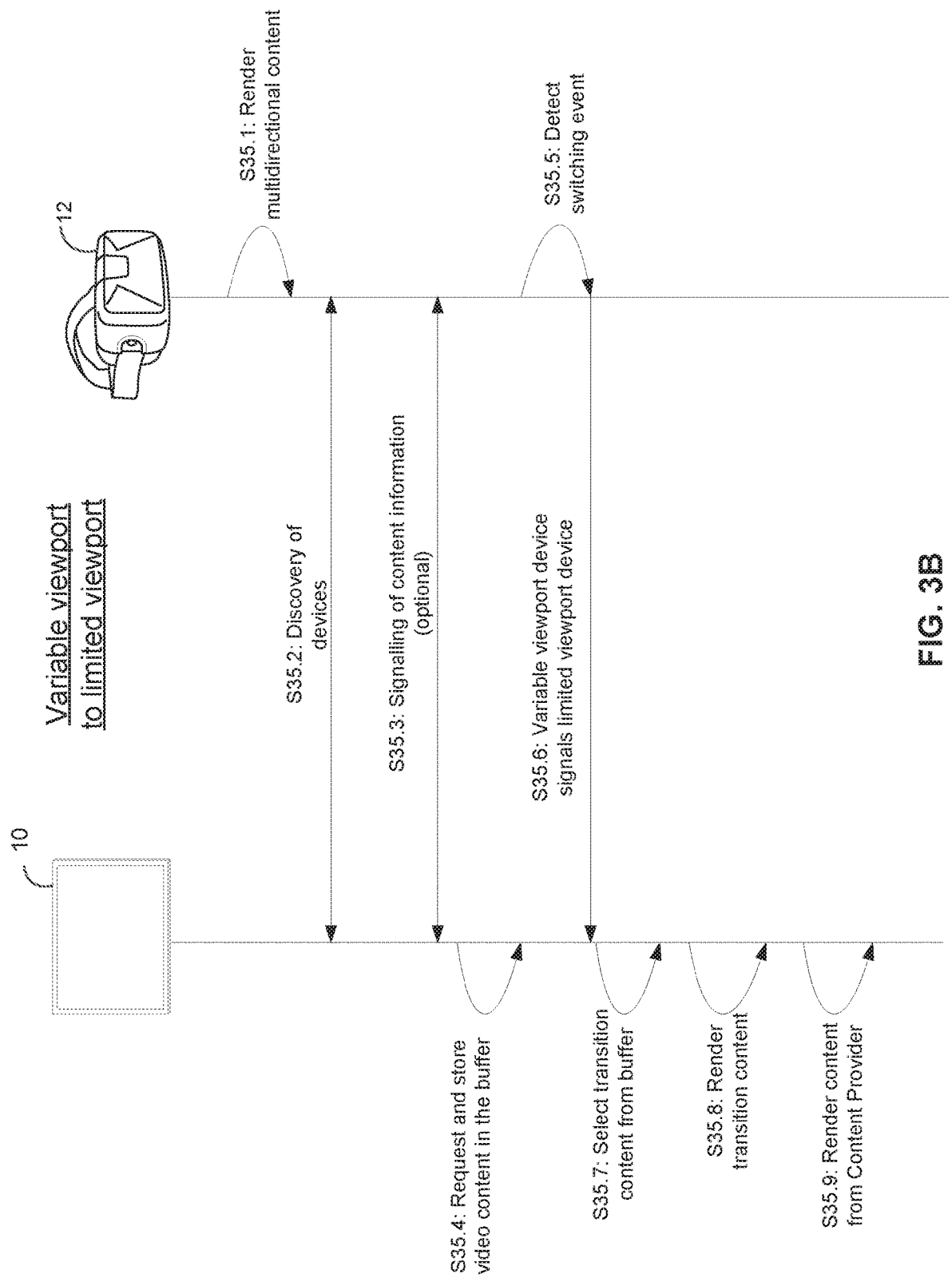

FIG. 3B is a message flow diagram illustrating various operations which may be performed when transitioning a viewing session from a variable viewport device to a limited viewport device.

Many of the operations illustrated in FIG. 3B are similar to those described in FIG. 3A. As such, the following description will focus primarily on the differences between the operations of FIG. 3A and FIG. 3B.

Firstly, at operation S35.1, multidirectional video content is received and rendered, for display at the variable viewport device 12.

In operation S35.2, device discovery may be performed in which the limited viewport device 10 and the variable viewport device 12 discover one another. This may be substantially as described with reference to operation of S30.3 of FIG. 3A.

In operation S35.3, information regarding the content being displayed at the variable viewport device 12 may be signalled from the variable viewport device 12 to the limited viewport device 10. This information may identify the multidirectional content that is being consumed via the variable viewport device 12 (e.g. via a content ID or channel name). The information may additionally or alternatively comprise a universal resource identifier (URI) for the content. The information may include a timestamp indicative of a particular frame of the multidirectional content that is currently being rendered on the variable viewport device 12.

In some examples, the signalling of operation S35.3 may be omitted. In such examples, the content being consumed via the variable viewport device 12 may have been indicated to the limited viewport device 10 in some other way. However, the signalling of operation S35.3 may facilitate preparation of the transition content by the limited viewport device 10, and so may reduce latency when transitioning between devices.

In some implementations, the variable viewport device 12 may periodically signal the limited viewport device 10 to ensure that the information received at the limited viewport device 10 on which the video content which is stored in the buffer is based is periodically updated. Thus, the limited viewport device 10 may be prepared for a sudden switching event in which the variable viewport device 12 is removed from the user without any prior indication.

In operation S35.4, the limited viewport device 10 may request receipt of multidirectional content corresponding to that currently being displayed by the variable viewport device 12. The request may include the information received from the variable viewport device 12 in operation S35.3. The received multidirectional content may then be stored in a buffer at the limited viewport device 10.

At operation S35.5, a switching event is detected. The switching event may be detected by the variable viewport device 12. For instance, the switching event may be a detection of a user removing the variable viewport device 12. Such an event may be detected using an accelerometer located at the variable viewport device 12 to detect movement of the variable viewport device 12, or using one or more touch and/or proximity sensors located to the variable viewport device 12 to detect contact or loss of contact with the user. Alternatively, the switching event may be detected by monitoring a power status of the variable viewport device 12.

The switching event may occur at a predetermined time, which may be preset at the variable viewport device 12. In implementations in which the switching event is predetermined, the user may be prompted to take off the variable viewport device 12 by a message displayed on the variable viewport device 12, or the display of the multidirectional content may be ended, thereby prompting the user to remove the variable viewport device 12.

Once the switching event has been detected, the variable viewport device 12 may signal the limited viewport device 10 at operation S35.6. This may be similar to the signalling of operation S30.7 of FIG. 3A. For instance, the signalling information may include a content ID indicating the channel or content currently being viewed on the variable viewport device 12.

The signalling information may comprise a timestamp corresponding to the switching event. For example, the timestamp may indicate the time at which the variable viewport device 12 was removed.

The signalling may also comprise information identifying the current viewport on the variable viewport device 12 at the time of the switching event.

At operation S35.7, in response to the switching event, the transition content is determined. For instance, the transition content may be selected from the multidirectional content stored in the buffer at the limited viewport device 10. The transition content is determined based on at least the current viewport on the variable viewport device 12 at the time of the switching event and the intended landing viewport on the limited viewport device 10. The determination of the transition content may be as described above with reference to FIGS. 1A, 1B, 2A and 2B.

At operation S35.8, the transition content is rendered at the limited viewport device 12, thereby providing a seamless transition between displaying content on each of the two devices is provided.

At operation S35.9, video content received at the limited viewport device 10, for instance from a content provider, is rendered at the limited viewport device 10. The rendered video content is output once provision of the transition content has finished. The video content received and rendered at the limited viewport device 10 may be a spatial portion (or a projection of a spatial portion) of the multidirectional video content previously output by the variable viewport device 12. Alternatively, the video content received and rendered the limited viewport device 10 may be limited viewport device content that corresponds to the multidirectional video content previously output by the variable viewport device 12.

In an embodiment of the invention, in case of live content (that cannot be paused), the user may have an option to choose between a seamless or lossless switch, which may result in going back in time (e.g. playing buffered content) or showing the missed content as a picture-in-picture content. In case of live content, the switching delay will result in a skew between the playback timestamp of the live playback content and the content rendered after lossless switch. In some embodiments, after the switch the playback starts with live playback timestamp. The content not displayed during device switch, that is the content received during the switching delay, can be rendered as a picture-in-picture overlay, thus removing the need for permanently delaying the content playback after a device switch.

In another embodiment of the invention, after the transfer of consumption (removing HMD or wearing the HMD) from one device to another, the media rendering is performed at a higher speed to eventually catch up with the real-time stream. The fast playback consists of identifying the salient representative segments in the missed content. The content playback may be delayed due to the device switch for rendering. This delay may be compensated by selecting a subset of representative frames from the temporal duration of the content received (but not displayed) during the switch. This enables the user to get an idea about the content that was not displayed during the switch. Selecting a subset of frames enables displaying the missed content with higher playback speed. The determination of the representative frames may be done based on client side analysis of the content to be rendered.

In yet another embodiment of the invention, the limited FOV or limited viewport device (e.g., TV) keeps a circular buffer of a predefined duration with a transformation that is suitable for the HMDs detected in the vicinity. Such a circular buffer may, for example, store transition content based on the viewing position of an HMD in the vicinity at the present time and/or based on the content ID of the content being displayed on the TV. The circular buffer may have a fixed temporal duration and may reset according to a first-in-first-out (FIFO) queueing method, for example. The transformation is performed to make the content suitable for rendering on the target device. For example, TV and HMD may require different projections for best experience (spherical, cylindrical, equirectangular, etc.). Having a buffer to store the transition content on the TV and performing the transformation locally at the TV enables low latency content transfer from TV to HMD for performing the switch. The temporal gap would be significantly larger if the content was instead requested from the content server.

Figure 4:
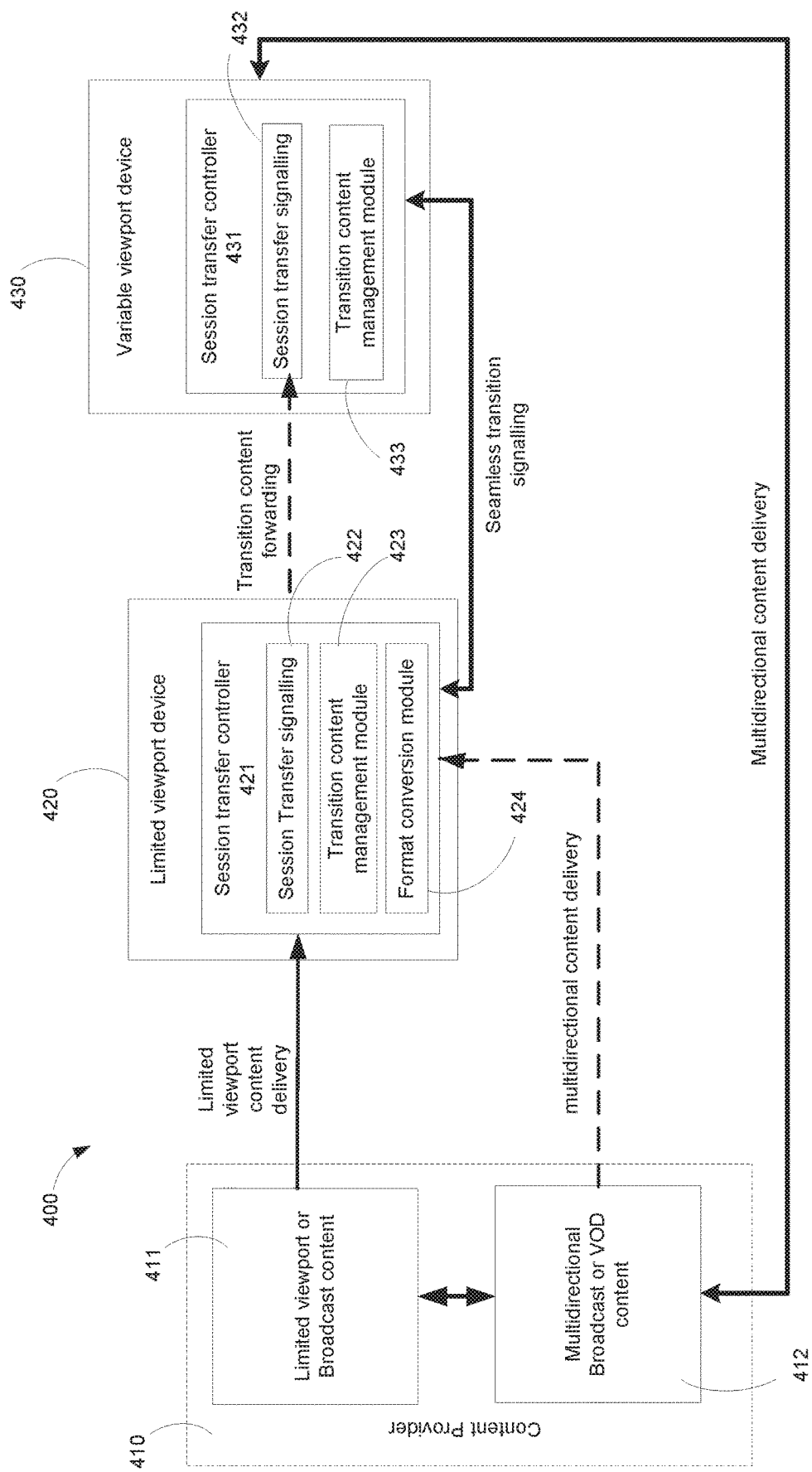
FIG. 4 shows an example of apparatus which may be used to carry out the operations described with reference to FIGS. 1A, 1B, 2A, 2B, 3A and 3B.

FIG. 4 is an example of a system 400 which may be used for carrying out various methods as described with reference to FIGS. 1A, 1B, 2A, 2B, 3A and 3B above.

In the example of FIG. 4, the system 400 comprises a limited viewport device 420, a variable viewport device 430, and a content provider 410.

The content provider 410 may, in some examples, be a broadcaster or a video-on-demand service provider. However, in other examples, the content provider may be of any type which provides multidirectional content. For instance, the content provider 410 may be a home media server device (such as a games console, a personal computer or any other multimedia playing device).

In the example of FIG. 4, the content provider 410 is configured to provide limited FOV or limited viewport video content 411 in addition to multidirectional video content 412. For instance, the limited viewport video content 411 may be suitable for rendering by the limited viewport device 420 and the multidirectional video content 412 may be suitable for rendering by the variable viewport device 430.

In the example shown in FIG. 4, the limited viewport device 420, which may be, for example, a TV, has a persistent connection with the content provider. This means that, when the content provider is a broadcaster or video-on-demand provider, the limited viewport device 420 has a permanently open communication channel with the content provider 420.

Since the limited viewport device 420 is the persistently connected device, in this example most of the functionality relating to the provision of transition content is by apparatus 421 implemented on the limited viewport device 420. In some implementations, the variable viewport device 430 may be the persistently connected device. This may be the case when the variable viewport device has a high amount of available processing capacity, such as when the variable viewport device is a personal computer connected head mounted display. In yet other implementations, the functionality relating to the provision of transition content may be shared equally between the limited viewport device 420 and the variable viewport device 430.

The content provider 410 provides video content which is rendered and output on the limited viewport device 420 or a variable viewport device 430. The limited viewport device may receive, for example, limited FOV/viewport or broadcast content 411 from the content provider 410.

The limited viewport device 420 comprises a session transfer controller 421, which may provide the following functionality.

The session transfer controller 421 may include a session transfer signalling module 422, which is configured for handling the signalling between limited viewport device 420 and the variable viewport device 430. The signalling may be as described above with reference to FIGS. 3A and 3B (particularly, but not exclusively, with reference to operations S35.2, S35.3, S35.6, S30.3, S30.4, and S30.7). For instance, the session transfer signalling module 422 may receive the indication of a switching event from the variable viewport device 430, and may respond accordingly, for instance, by notifying a transition content management module 423.

The session transfer controller 421 may additionally include a transfer content management module 423. The transfer content management module 423 may be configured to determine the transition content for provision during the transition phase. This may be performed as described above. The transfer content management module 423 may additionally be configured to cause the device (e.g. the session transfer signalling module 422) to request multidirectional video content from the content provider 410. The request may for instance, be based on information received from the variable viewport device 430. In examples in which the whole spatial extent of the multidirectional content is not received from the content provider, the transfer content management module 423 may also be configured to indicate the spatial extent (e.g. which tiles) of the multidirectional content that should be received. As discussed above, this may be based on the angular separation between the current viewport and the landing viewport.

The transfer content management module 423 may then store the received multidirectional content in a circular buffer and select the transition content from the content stored in the circular buffer in response to detection of a switching event (for instance, based on signalling information received from the variable viewport device 430). As discussed above, selection of the transition content may be based on the angular separation between the current viewport and the landing viewport at the time of the switching event. The transfer content management module 423 may additionally be configured to cause the transition content to be forwarded to the variable viewport device 430.

The session transfer controller 421 may additionally include a format conversion module 424. The format conversion module 424 may be configured to convert the format of the received multidirectional content in order to generate the transition content that is suitable for display on either of the limited viewport device 420 or the variable viewport device 430, as required. For instance, when the transition content is to be displayed on the limited viewport device, the format conversion module 424 may be configured to convert relevant spatial portions of the multidirectional content into limited FOV or limited viewport projections, which can be output by the limited viewport device 420.

The variable viewport device 430 may also include a session transfer controller 431. The session transfer controller 431 of the variable viewport device 430 may include a session transfer signalling module 432, which may be configured to handle signalling between the two devices. The signalling may be as described above with reference to FIGS. 3A and 3B.

In addition, the session transfer controller 431 may include transition content management module 433. The transition content management module 433 may, for instance, be configured to detect switching event, and to cause the session transfer signalling module 432 to signal the switching event to the limited viewport device 420. The transition content management module 433 may additionally be configured to receive transition content received from the limited viewport device 420 and to cause this to be rendered at the variable viewport device 430.

As will be appreciated, the variable viewport device may be configured to receive multidirectional video content from the content provider 410. This may be requested by the variable viewport device 430 or the limited viewport device 420 may indicate to the content provider 410 that multidirectional content should be transmitted to the variable viewport device 430.

Figure 5:
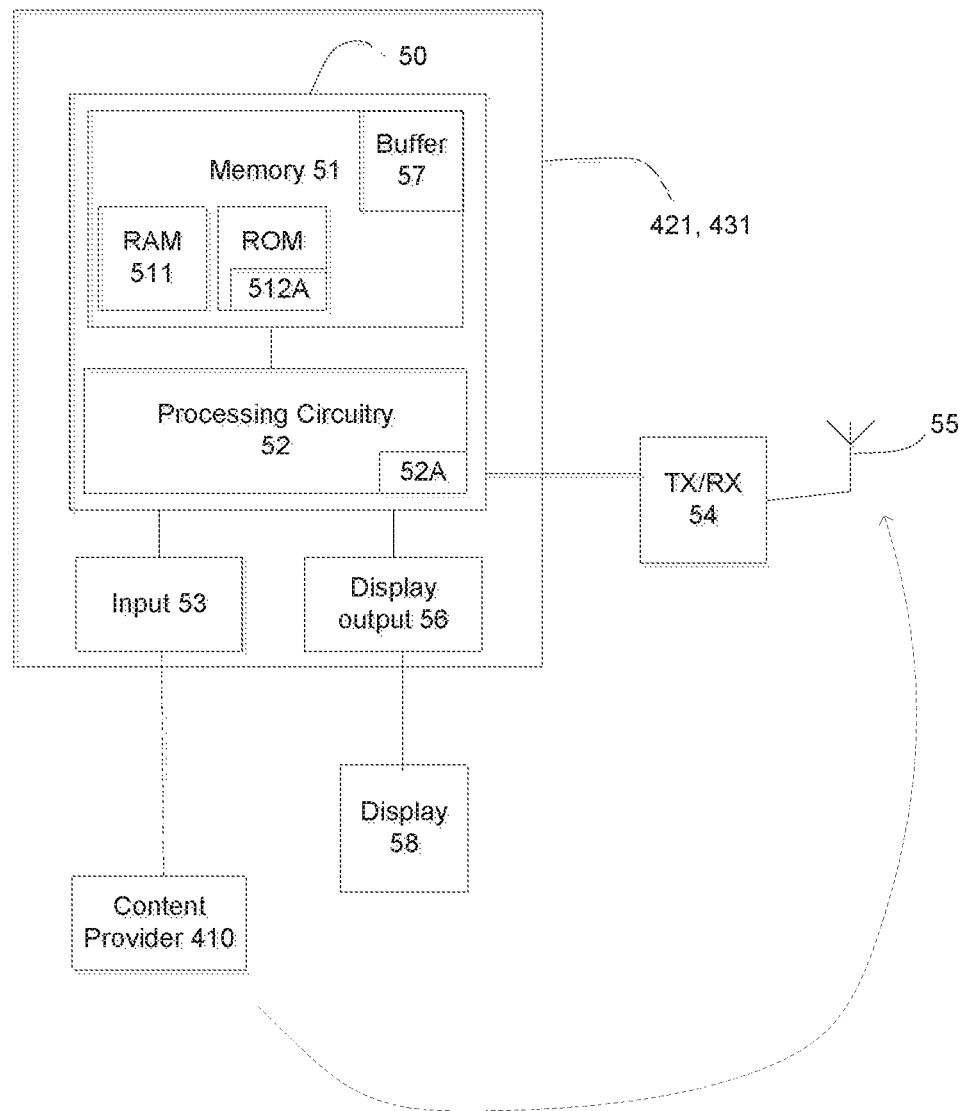
FIG. 5 shows a schematic illustration of an example hardware configuration with which the system described with reference to FIG. 4 may be implemented.

FIG. 5 is a schematic illustration of an example hardware configuration with which either of the session transfer controllers 421, 431 described above with reference to FIG. 4 may be implemented. As described previously, the session transfer controller 421, 431 may be implemented in a device such as a variable viewport device or a limited viewport device as described in reference to FIGS. 1 to 4 above.

The session transfer controller comprises processing apparatus 50. The processing apparatus 50 is configured to perform various operations as described with reference FIGS. 1 to 4.

Video content may be received at the processing apparatus 50 via an input interface 53. In the example in FIG. 5, the video content may be received at the processing apparatus 50 via wired communication (e.g. via an input interface 53) and/or wireless communication (via transceiver 54 and antenna 55) from the content provider 410 or from a local storage medium.

After the video content has been received, the processing apparatus 50 may provide the video content to an output interface 56. The video content may be provided for display via a display device 58. In some instances, the output video content may be transmitted wirelessly via the transceiver 54 and antenna 55 to a display device 58 of the device in which the session transfer controller is located. Additionally or alternatively, the output video content may be stored in local storage 51 at the processing apparatus 50 for later retrieval.

In addition, the processing apparatus 50 may, for instance when located in a variable viewport device, be configured to receive the transition content, via a wired or wireless from the limited viewport device.

The signalling between the devices, for instance, as described above, may be conducted over a wired or wireless connection. For example, processing apparatus 50 may receive capability information and/or content information from the other device via the transceiver 54 and antenna 55. The transceiver 54 and antenna 55 may, in some examples, be for specific use by the session transfer controller 421, 431. Alternatively, the session transfer controller 421, 431 may utilise the transceiver 54 and antenna 55 of the host device.

The processing apparatus 50 may comprise processing circuitry 52 and memory 51. Computer-readable code 512A may be stored on the memory 51, which when executed by the processing circuitry 52, causes the processing apparatus 50 to perform any of the operations described herein. In some examples, the computer-readable code 512A, may include various code modules corresponding to the modules illustrated in FIG. 4. For instance, when the session transfer controller 421 is located at the limited viewport device, it may include a session transfer signalling code module a transition content management code module, and a format conversion module.

The memory 51 may include the buffer 57 for buffering received multidirectional content, as described above. The buffer may be a circular buffer which is continuously being updated. The processing apparatus 50, for instance operating under control of the transition content management code module, may manage the content stored in the buffer, for instance in dependence on the current viewport and the landing viewport.

As will be appreciated, the session transfer controller 421, 431 may include one or more components which are not illustrated and described above. Similarly, the device in which the session transfer controller 421, 431 is located may include a number of components which are not illustrated in FIG. 5. These will be apparent to the skilled person, and so are not described in detail here.

Some further details of components and features of the above-described session transfer controller 421, 431 and alternatives for them will now be described.

The processing apparatus 50 may comprise processing circuitry 52 communicatively coupled with memory 51. The memory 51 has computer readable instructions 512A stored thereon, which when executed by the processing circuitry 52 causes the processing apparatus 50 to cause performance of various ones of the operations described with reference to FIGS. 1 to 4. The processing apparatus 50 may in some instances be referred to, in general terms, as "apparatus", "computing apparatus" or "processing means".

The processing circuitry 52 may be of any suitable composition and may include one or more processors 52A of any suitable type or suitable combination of types. Indeed, the term "processing circuitry" should be understood to encompass computers having differing architectures such as single/multi-processor architectures and sequencers/parallel architectures. For example, the processing circuitry 52 may be a programmable processor that interprets computer program instructions 512A and processes data. The processing circuitry 52 may include plural programmable processors. Alternatively, the processing circuitry 52 may be, for example, programmable hardware with embedded firmware. The processing circuitry 52 may alternatively or additionally include one or more specialised circuit such as field programmable gate arrays FPGA, Application Specific Integrated Circuits (ASICs), signal processing devices etc.

The processing circuitry 52 is coupled to the memory 51 and is operable to read/write data to/from the memory 51. The memory 51 may comprise a single memory unit or a plurality of memory units, upon which the computer readable instructions (or code) 512A is stored. For example, the memory 51 may comprise both volatile memory 511 and non-volatile memory 512. In such examples, the computer readable instructions/program code 52A may be stored in the non-volatile memory 512A and may be executed by the processing circuitry 52 using the volatile memory 511 for temporary storage of data or data and instructions. Examples of volatile memory include RAM, DRAM, and SDRAM etc. Examples of non-volatile memory include ROM, PROM, EEPROM, flash memory, optical storage, magnetic storage, etc.

The memory 51 may be referred to as one or more non-transitory computer readable memory medium or one or more storage devices. Further, the term 'memory', in addition to covering memory comprising both one or more non-volatile memory and one or more volatile memory, may also cover one or more volatile memories only, one or more non-volatile memories only. In the context of this document, a "memory" or "computer-readable medium" may be any media or means that can contain, store, communicate, propagate or transport the instructions for use by or in connection with an instruction execution system, apparatus, or device, such as a computer.

The computer readable instructions/program code 512A may be pre-programmed into the processing apparatus 50. Alternatively, the computer readable instructions 512A may arrive at the control apparatus via an electromagnetic carrier signal or may be copied from a physical entity such as a computer program product, a memory device or a record medium such as a CD-ROM or DVD. The computer readable instructions 512A may provide the logic and routines that enables the session transfer controller 421, 431 to perform the functionality described above. The combination of computer-readable instructions stored on memory (of any of the types described above) may be referred to as a computer program product. In general, references to computer program, instructions, code etc. should be understood to express software for a programmable processor firmware such as the programmable content of a hardware device as instructions for a processor or configured or configuration settings for a fixed function device, gate array, programmable logic device, etc.

The transceiver and antenna 54, 55 may be adapted for any suitable type of wireless communication including but not limited to a Bluetooth protocol, a cellular data protocol or a protocol in accordance with IEEE 802.11.

The input and/or output interface 53, 56 may be of any suitable type of wired interface. For instance, when one or both of the interfaces is configured for wired connection with another device, they may be, for instance but not limited to, physical Ethernet or HDMI interfaces.

If desired, the different functions discussed herein may be performed in a different order and/or concurrently with each other. Furthermore, if desired, one or more of the above-described functions may be optional or may be combined.

Although various aspects of the methods, apparatuses described herein are set out in the independent claims, other aspects may comprise other combinations of features from the described embodiments and/or the dependent claims with the features of the independent claims, and not solely the combinations explicitly set out in the claims.

It is also noted herein that while the above describes various examples, these descriptions should not be viewed in a limiting sense. Rather, there are several variations and modifications which may be made without departing from the scope of the present invention as defined in the appended claims.

The invention claimed is:

1. A method comprising:
   in response to detecting a user switching from viewing multidirectional video content to viewing limited viewport video content corresponding to the multidirectional video content or from viewing the limited viewport video content, corresponding to the multidirectional video content, to viewing the multidirectional video content:
  determining transition content for transitioning between a current viewport associated with the multidirectional video content or the limited viewport video content being viewed and a landing viewport associated with the multidirectional video content or the limited viewport video content to be viewed, the transition content being determined based on the current viewport and the landing viewport, wherein length of the transition content depends on an angular distance between the current viewport and the landing viewport and a predetermined angular speed for transition from an angular position associated with the current viewport to an angular position associated with the landing viewport, wherein the current viewport is configured to be viewed on a first apparatus and the landing viewport is configured to be viewed on a second apparatus; and
  outputting the transition content from the first apparatus to the second apparatus for display,
  wherein at least a portion of the multidirectional video content is stored in a buffer and updated based on the current viewport and the landing viewport,
  wherein a duration of the multidirectional video content stored in the buffer is dependent on an angular position associated with the current viewport and the angular position associated with the landing viewport, and the length of the transition is equal to the duration of the multidirectional video content stored in the buffer, and
  wherein the duration of the multidirectional video content stored in the buffer is equal to a predetermined value calculated as angular skew divided by angular rotation velocity, and wherein the angular skew is calculated as an angular position of the current viewport minus the angular position of the landing viewport.

2. A non-transitory computer-readable medium having computer-readable code stored thereon, the computer readable code, when executed by at least one processor, causing performance of:
  in response to detecting a user switching from viewing multidirectional video content to viewing limited viewport video content corresponding to the multidirectional video content or from viewing the limited viewport video content corresponding to the multidirectional video content to viewing the multidirectional video content:
  determining transition content for transitioning between a current viewport associated with the multidirectional video content or the limited viewport video content being viewed and a landing viewport associated with the multidirectional video content or the limited viewport video content to be viewed, the transition content being determined based on the current viewport and the landing viewport, wherein length of the transition content depends on an angular distance between the current viewport and the landing viewport and a predetermined angular speed for transition from an angular position associated with the current viewport to an angular position associated with the landing viewport, wherein the current viewport is configured to be viewed on a first apparatus and the landing viewport is configured to be viewed on a second apparatus; and
  outputting the transition content from the first apparatus to the second apparatus for display,
  wherein at least a portion of the multidirectional video content is stored in a buffer and updated based on the current viewport and the landing viewport,
  wherein a duration of the multidirectional video content stored in the buffer is dependent on an angular position associated with the current viewport and the angular position associated with the landing viewport, and the length of the transition is equal to the duration of the multidirectional video content stored in the buffer, and
  wherein the duration of the multidirectional video content stored in the buffer is equal to a predetermined value calculated as angular skew divided by angular rotation velocity, and wherein the angular skew is calculated as an angular position of the current viewport minus the angular position of the landing viewport.

3. An apparatus comprising:
  at least one processor; and
  at least one memory including computer program code, which when executed by the at least one processor, causes the apparatus, in response to detecting a user switching from viewing multidirectional video content to viewing limited viewport video content corresponding to the multidirectional video content or from viewing the limited viewport video content corresponding to the multidirectional video content to viewing the multidirectional video content, to:
  determine transition content for transitioning between a current viewport associated with the multidirectional video content or the limited viewport video content being viewed and a landing viewport associated with the multidirectional video content or the limited viewport video content to be viewed, the transition content being determined based on the current viewport and the landing viewport, wherein a length of the transition content depends on an angular distance between the current viewport and the landing viewport and a predetermined angular speed for transition from an angular position associated with the current viewport to an angular position associated with the landing viewport, wherein the current viewport is configured to be viewed on the apparatus and the landing viewport is configured to be viewed on another apparatus; and
  output the transition content to the other apparatus for display,
  wherein at least a portion of the multidirectional video content is stored in a buffer and updated based on the current viewport and the landing viewport,
  wherein a duration of the multidirectional video content stored in the buffer is dependent on an angular position associated with the current viewport and the angular position associated with the landing viewport, and the length of the transition is equal to the duration of the multidirectional video content stored in the buffer, and
  wherein the duration of the multidirectional video content stored in the buffer is equal to a predetermined value calculated as angular skew divided by angular rotation velocity, and wherein the angular skew is calculated as an angular position of the current viewport minus the angular position of the landing viewport.

4. The apparatus of claim 3, wherein the transition content comprises a series of spatial portions of the multidirectional video content which are spatially located between the current viewport and the landing viewport.

5. The apparatus of claim 3, wherein a spatial extent of the multidirectional video content stored in the buffer is dependent on angular position associated with the current viewport and the angular position associated with the landing viewport.

6. The apparatus of claim 3, wherein the transition content comprises a sequence of frames, each having an associated angular position, wherein the angular position associated with the frames gradually varies from an angular position corresponding with, or nearer to, the angular position of the current viewport to an angular position corresponding with, or nearer to, the angular position of the landing viewport.

7. The apparatus of claim 3, wherein the current viewport is configured to be viewed on the apparatus, the landing viewport is configured to be viewed on another apparatus, and the outputting the transition content is for display on the other apparatus.

8. The apparatus of claim 7, wherein the apparatus comprises a limited viewport display device and the other apparatus comprises a variable viewport display device.

9. The apparatus of claim 8, wherein the current viewport comprises a planar representation of, or corresponding to, a spatial portion of the multidirectional video content.

10. The apparatus of claim 7, wherein to output the transition content, the apparatus is further caused to transmit the transition content to the other apparatus.

11. The apparatus of claim 8, wherein the apparatus is further caused to detect the user switching from viewing the multidirectional video content or the limited viewport video content being viewed on the apparatus to viewing the multidirectional video content or the limited viewport video content to be viewed on the other apparatus, and wherein to detect the content being switched, the apparatus is further caused to detect the user activating the other apparatus or putting on the other apparatus.

12. The apparatus of claim 3, wherein the apparatus comprises a television, a video projector, a mobile phone, a laptop, a personal computer or a tablet computer and/or wherein the other apparatus comprises a head mounted display, an augmented reality device, or a virtual reality device.

13. The apparatus of claim 7, wherein the apparatus comprises a variable viewport display device and the other apparatus comprises a limited viewport display device.

14. The apparatus of claim 13, wherein the landing viewport on the other apparatus comprises a planar representation of a portion of the multidirectional video content.

15. The apparatus of claim 13, wherein the apparatus is configured to communicate information indicative of the current viewport to the other apparatus, a timestamp of the transition, and a uniform resource identifier (URI) of the variable viewport display device.

16. The apparatus of claim 13, wherein the apparatus is further caused to detect the user switching between viewing the multidirectional video content or the limited viewport video content being viewed on the apparatus and viewing the multidirectional video content or the limited viewport video content to be viewed on the other apparatus, and wherein to detect the content being switched, the apparatus is further caused to detect the user deactivating or taking off the apparatus.

17. The apparatus of claim 7, wherein the other apparatus comprises a television, a video projector, a mobile phone, a laptop, a personal computer or a tablet computer and/or wherein the apparatus comprises a head mounted display, an augmented reality device or a virtual reality device.

* * * * *